Sept. 20, 1966  A. R. RODRIGUEZ ETAL  3,274,468
ELECTRIC CAPACITOR AND METHOD FOR PRODUCING THE SAME
Filed Oct. 7, 1954  3 Sheets-Sheet 1
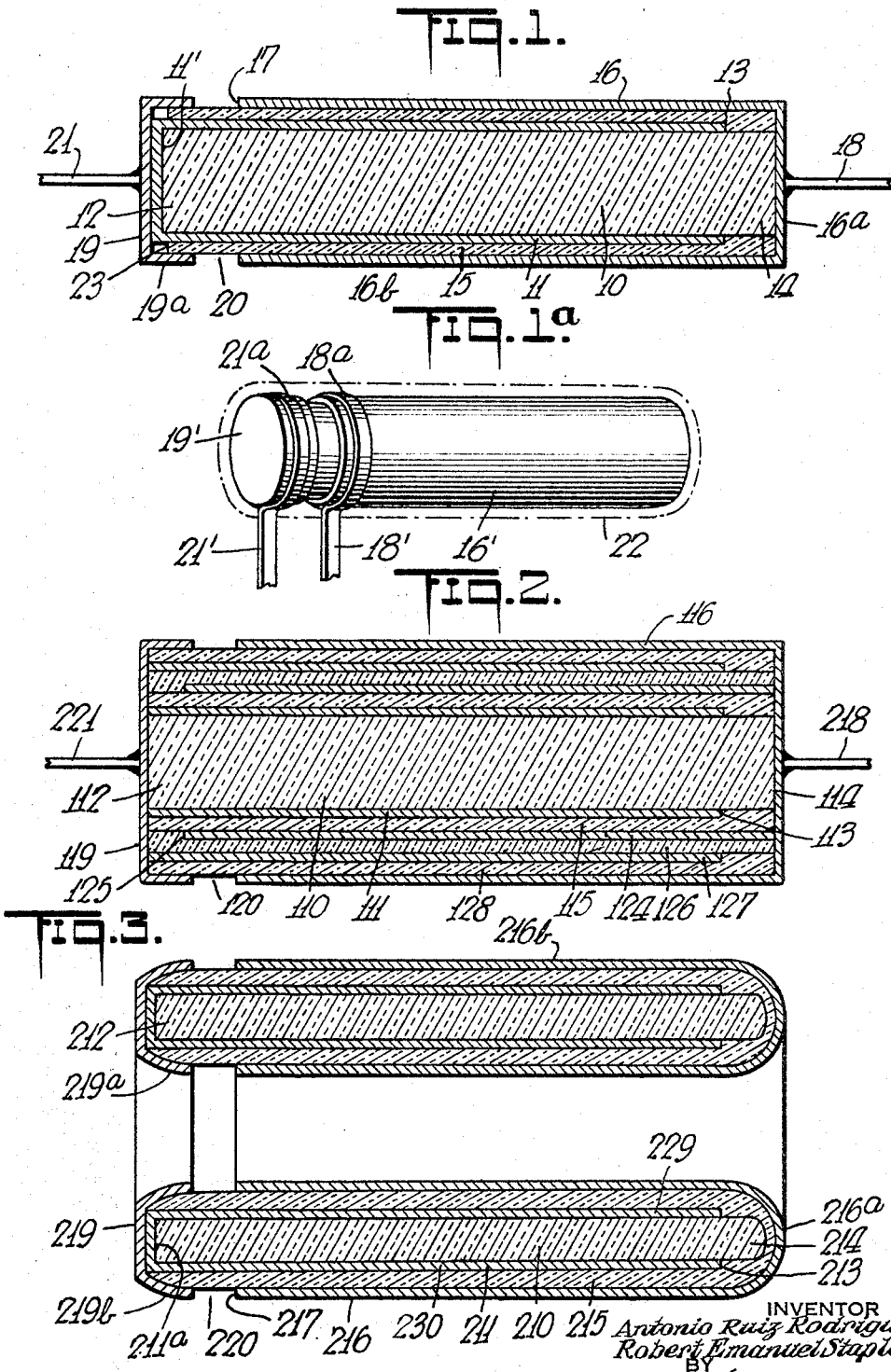
INVENTOR
Antonio Ruiz Rodriguez
Robert Emanuel Stapleton
BY
Dean Fairbank & Hirsch
ATTORNEYS

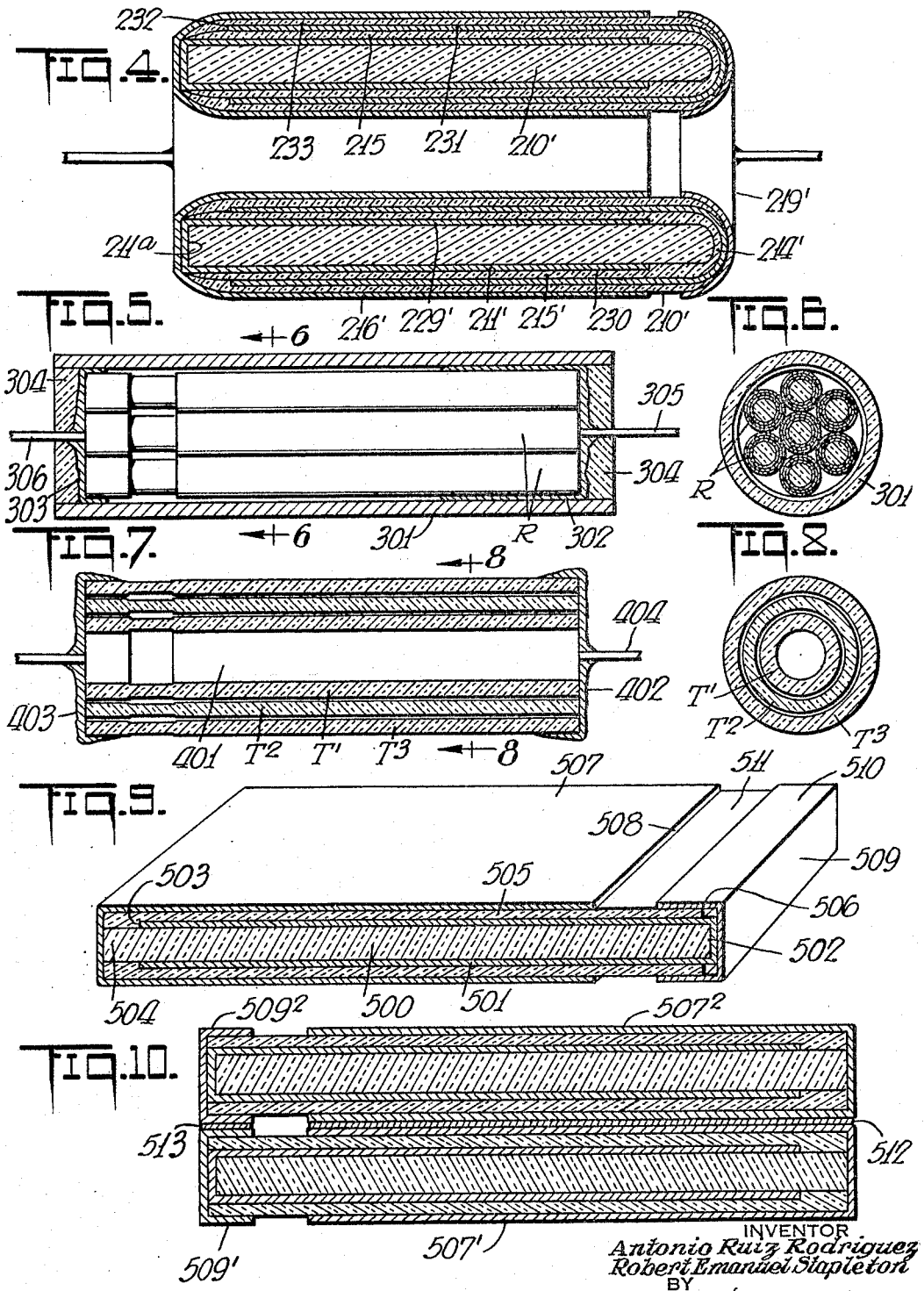

Fig. 11.

```
COAT CORE OF GREEN CERAMIC WITH METAL
IN SUSPENSION TO FORM INNER ELECTRODE
LEAVING ONE END PORTION OF CORE EX-
POSED.
            ↓
DRY METAL SUSPENSION TO FORM COATING.
            ↓
COAT METAL COATED CORE WITH CERAMIC
SLIP.
            ↓
DRY CERAMIC SLIP TO FORM DIELECTRIC
COATING.
            ↓
FIRE TO MATURE DIELECTRIC COATING.
            ↓
APPLY METAL ELECTRODE OVER DIELECTRIC
COATING LEAVING EXPOSED PORTION OF
COATING AT OTHER END PORTION OF CORE.
            ↓
DRY AND FIRE UNIT.
            ↓
APPLY TERMINAL CONNECTION TO ENDS OF
INNER AND OUTER ELECTRODES AT OPPOSED
ENDS OF CORE.
```

INVENTORS
ANTONIO RUIZ RODRIGUEZ
ROBERT EMANUEL STAPLETON

ATTORNEYS

United States Patent Office

3,274,468
Patented Sept. 20, 1966

3,274,468
ELECTRIC CAPACITOR AND METHOD FOR PRODUCING THE SAME
Antonio Ruiz Rodriguez and Robert Emanuel Stapleton, Franklinville, N.Y., assignors to Aerovox Corporation, a corporation of Massachusetts
Filed Oct. 7, 1954, Ser. No. 460,797
15 Claims. (Cl. 317—258)

The present invention relates to electric capacitors that are of extraordinarily small bulk for a given capacitance and thus are adapted more especially for use in such equipment as demands miniaturization, as for instance in association with printed circuits and transistors for electronic control in computer installations, hearing aids and the like.

The invention is more especially concerned with ceramic capacitors of the type in which the dielectric is made up of a mixture of fired titanates of the type which may have a dielectric constant of 10 to 10,000, though the range as generally used is between 30 and 6000. Such titanates according to the present invention are applied upon a suitable small core, in thin film usually from .0005 inch to .010 inch in thickness, affording the desired capacitance in the extremely small bulk required, which may be in the order of a length of from ¼ to ¾ inch and overall diameter of the order of that of the graphite rod of a thin lead pencil.

It is among the objects of the invention to provide a capacitor of the above type and for the above purpose, in which the drying and firing of the film or films of ceramic dielectric is effected without stress or rupture of the dielectric film due to differential expansion or chemical reaction between the film and the associated carrying structure or rupture or discontinuity of the electrodes at opposite faces of the dielectric film, which capacitor may be fabricated in mass production with tolerance of capacitance within the usual permissible limits, despite the thinness of the dielectric ceramic film, and which capacitor is inherently sufficiently rugged to withstand the handling to which such units may be subjected in installation and to withstand such vibration and shock as they may suffer in the course of use.

An important feature of the invention is the painting of an inner electrode of suitable non-oxidizing, refractory metal, preferably platinum or palladium upon a thin core of green ceramic, preferably of the same composition as the ceramic film to be thereupon applied in a slurry or slip to the external surface of the inner electrode.

The inner electrode is dried by suitable application of heat or if desired by moderate firing before application of the slurry or slip of dielectric film and upon suitable drying of said film, the unit as thus far made is fired and maintained at the maturing temperature of the dielectric coating as well as of the dielectric core. Preferably the inner electrode covers one end of the core and ends at some distance from the opposite end of the core. After firing, the ceramic dielectric film is coated with the companion electrode, preferably a slurry of metallic silver which extends over the free end of the core and extends over the dielectric film lengthwise of said core to terminate at some distance from the end covered by the inner electrode. The silver electrode is dried and fired sufficiently to cause the silver particles to coalesce and become adequately bonded with the dielectric film.

According to another feature, a silver coating, preferably in the form of a cap, is also bonded to the end surface of the inner electrode for terminal connection, said cap being suitably spaced from the outer electrode to avoid short circuit. Terminal leads may extend from the outer electrode and the inner electrode, either axially from opposite ends or radially thereof, desirably from the same end, that is from the silver terminal or cap for the inner electrode and directly from the outer or silver electrode.

While the invention is ordinarily embodied in thin rod-like structures as above indicated, with the inner electrode, the ceramic dielectric film and the outer electrode successively bonded about the core, the invention may also be embodied in a plate structure in which a thin ceramic plate is coated successively in the general manner set forth, with inner electrode, ceramic film dielectric and outer electrode.

The invention in either of its general embodiments may be embodied in various manners in a unit comprising two or more capacitor sections of the type hereinabove set forth, connected in parallel for greater capacitance in small bulk.

In the accompanying drawings in which are shown one or more of various embodiments of the several features of the invention, FIG. 1 is a view in longitudinal cross-section on a greatly enlarged scale of one embodiment of the invention, FIG. 1a is a perspective view of a modification on a somewhat smaller scale involving a variation of terminal leads, FIG. 2 is a view similar to FIG. 1 of a variation involving multiple capacitor sections connected in parallel, FIG. 3 is a view similar to FIG. 1 showing a modification which affords greater capacitance and requires somewhat larger diameter than the embodiment of FIG. 1, FIG. 4 is a view similar to FIG. 3 of a variation involving a plurality of capacitor sections connected in parallel, FIG. 5 is a view similar to FIG. 1, showing an embodiment in which a plurality of rod capacitors such as that of FIG. 1, are combined in a composite unit of correspondingly greater capacitance with the rod capacitors connected in parallel, FIG. 6 is a transverse sectional view taken on line 6—6 of FIG. 5, FIG. 7 is a somewhat schematic view similar to FIG. 1, showing an embodiment in which a plurality of telescoped tubular capacitor sections of the general type shown in FIG. 3, and of progressively larger diameter, are telescoped in an assembly and connected in parallel, to form a composite unit, FIG. 8 is a transverse sectional view taken on line 8—8 of FIG. 7, FIG. 9 is a perspective view partly in section, showing an application of the invention to a capacitor of the plate type, FIG. 10 is a view similar to FIG. 9 of a variation involving multiple capacitor sections connected in parallel to form a composite unit, and FIG. 11 is a flow chart illustrating the method of the invention.

Referring now to FIG. 1 of the drawings, the ceramic capacitor comprises a core 10 in the form of a rod of ceramic, the thickness of which may be as large or as small as desired, but for most practical purposes would be from .025 to .040 inch in diameter. That core is covered with an inner electrode 11, preferably a thin film of metal of the type that will not melt or oxidize in the course of processing, including firing of the ceramic dielectric, and to this end is preferably of platinum or palladium. This inner electrode may cover the end 12 of the rod as at 11' and extends over nearly the entire cylindrical face of the rod from said end to terminate at 13 some distance from the opposite end 14 of the rod.

The inner electrode 11 of platinum or palladium may be applied to the core as a paint comprising a suspension of the metal in a suitable vehicle such for instance, as butyl Carbitol acetate, butyl lactate or toluol, preferably together with organic binder for dry adherence, and a small amount of glass frit to furnish the necessary bond between the palladium and the ceramic on firing. Alternatively the platinum or palladium may be applied in the form of a resinate. This application may be done by dipping or spraying and after the application, the paint is dried, preferably at about 240° F. to drive off the vehicle or in some cases it may be fired at a temperature in the order of 1800° F., especially where the paint is applied as a resinate.

Encompassing the rod and said inner electrode is a thin film of ceramic dielectric which film may be of the order of .0005" to .010" in thickness. This dielectric film 15 extends preferably somewhat short of the entire length of the rod or core from end 14, preferably to point 23 near end 12, that is, to slightly short of that extremity of the rod which bears the end electrode portion 11'.

The outer electrode 16, preferably of silver, extends at 16$^a$ across end 14 of the rod and encompasses the dielectric film as at 16$^b$ for nearly the length of the rod, but ends as at 17 at some distance from the end 12 of the rod.

The silver electrode 16 lends itself readily to soldering thereto of a terminal lead as at 18. Since the platinum or palladium electrode portion 11' does not lend itself to soldering of a terminal thereto, the corresponding end of the rod is desirably covered with a silver coating or cap 19 similar to the silver electrode 16, which is directly plated upon the platinum or palladium end 11' and has a cylindrical portion 19$^a$ encompassing the dielectric film 15 with a substantial margin or space 20 between the silver electrode 16 and the silver cap 19 to preclude short circuit. To the silver cap 19 there may be soldered the second terminal lead 21 which thus serves for connection to the inner electrode 11.

To coat the metal coated core rod 10 with the film of dielectric, that rod may be dipped into a slip or slurry of the dielectric or such slurry may be sprayed upon the rod until the desired thickness is reached.

The ceramic slip is of the familiar mixture of titanates, usually including barium, calcium and strontium titanates, and for certain purposes corresponding zirconates may be added as is understood by those skilled in the art, all dispersed in water with the use of a suitable deflocculating agent such as alginates such as sodium and/or ammonium alginate and/or derivates of lignion as calcium lignate. This ceramic slurry is preferably of the same ceramic as substantially the same ceramic as the material of the core or rod 10. The slip coating of ceramic is preferably dried at about 120° C. prior to the firing operation.

In the firing of the capacitor structure prior to applica tion of the outer or silver electrode 16 and cap 19, which structure then consists of the core, the inner refractory electrode and the dielectric film, the green ceramic core o1 rod 10 and the dried dielectric film 15 are matured at a temperature of about 2000° to 2700° F. depending on the composition. There will be no differential expansion under the heat of the dielectric core and the dielectric film, since they are of like material and therefore there is no stress tending to strain or rupture the thin dielectric film 15 or to impair the integrity of the inner electrode 11, which being of platinum or palladium will neither melt nor oxidize, and accordingly no impairment of the capacitor will be suffered in the firing operation.

The fired and thus vitrified film 15 of the dielectric is then coated with the outer or silver electrode 16 and desirably also the silver end cap 19, which electrode and cap are preferably applied in the form of a silver paint, the metal particles of which are dispersed in any suitable vehicle, preferably together with organic binder for dry adherence and a small amount of glass frit to furnish the necessary bond between the silver and the ceramic on firing. The application is by dipping or spraying, followed by drying, to drive off the carrier, preferably at about 300° F., and then mild firing, preferably at about 1400° F. to cause the silver particales to coalesce and to become adequately bonded to the ceramic film 15, whereupon the leads 18 and 21 are attached.

In one commercial embodiment, shown in FIG. 1$^a$ on a somewhat smaller scale than in FIG. 1, the leads 18' and 21' are straps 18$^a$ and 21$^a$ respectively about the structure to extend laterally respectively from the silver cap 19' and the proximate end of the silver electrode 16', or alternatively, the leads thus directed may be soldered in place. Preferably a conventional form of insulating lacquer coats the capacitor, as shown at 22, and is applied after the terminal leads 18' and 21' have been affixed, that lacquer covering the entire body of the capacitor and the root ends only of said terminal leads.

In one commercial embodiment of capacitor such as shown in FIGS. 1 and 1$^a$, the overall diameter of the rod may be only about .030 inch and its length in the order of ½ inch, the capacitance, depending on the thickness and dielectric constant of dielectric film, varying from 10 mmf. to 20,000 mmf. or more.

The capacitor of the invention is of extraordinarily minute dimensions and relatively low cost of production. The core or rod has sufficient stamina, adequately to reinforce the thin dielectric film so that the capacitor unit will not be lively to fracture or suffer other injury in the course of handling in installation or under such vibration or shock as it may incur in the ordinary use of the equipment of which it constitutes a component part.

FIG. 2 is an embodiment of capacitor in which two or more capacitor sections connected in parallel form a single composite unit of somewhat larger diameter and correspondingly greater capacitance than the embodiment of FIG. 1. The rod or core 110 is similar to that of FIG. 1 and the electrode 111 of platinum or palladium is similar to electrode 11 of FIG. 1, except that it need extend only along the cylindrical length of the rod, illustratively to the extremity 112 of the rod (though it may, if desired, also extend over said extremity or end 112). The electrode 111 terminates at 113 at some distance from the other extremity 114. The dielectric film 115 corresponds to dielectric film 15 of FIG. 1. Upon the outside of dielectric film 115 is a second metal electrode 124 of platinum or palladium similar to electrode 111, except that its one extremity is flush with end 114 of the rod, while its other extremity 125 is at some distance from the other end 112 of the rod. A second film of ceramic dielectric 126 encompasses the electrode 124 and is in turn encompassed by a third electrode 127 which is related lengthwise of the capacitor the same way as is electrode 111. Encompassing electrode 127 is a third film 128 of ceramic dielectric. The outer silver electrode 116 is in electrical contact with the corresponding end of the electrode 124 and electrodes 111 and 127 engage the silver cap 119 which corresponds to silver cap 19 of FIG. 1, and is spaced by margin 120 from the electrode 116. Thus three capacitor sections as shown are connected in parallel, viz, those with dielectric film 115, 126 and 128, respectively. Of course the capacitor could be made with as few as two sections and with more than three sections according to the principle set forth.

In manufacture it will be understood that each electrode is dried in the manner set forth in the description of FIG. 1, after application and prior to application of the dielectric slip or slurry that encompasses the same and that each film of slip or slurry is dried prior to application of the electrode that encompasses the same, all in the manner described in connection with the embodiment of FIG. 1. After the capacitor has been completed, except for its outer silver electrode 116 and silver cap 119, it is fired in the manner set forth in the description of the embodiment of FIG. 1, the core and the various dielectric films thus being vitrified in one operation.

FIG. 3 is generally similar to FIG. 1, but shows an embodiment of larger diameter and of correspondingly larger range of capacitance. Essentially the embodiment of FIG. 3 comprises a ceramic core 210 in the form of a tube. The inner or refractory electrode 211 of platinum or palladium covers one extremity of the tube as at 211$^a$, and extends lengthwise of the tube both along its inner surface at 229 and its outer surface as at 230 and ends at 213 short of the other extremity of the tube. The ceramic dielectric 215, applied in the form of a slurry or slip for subsequent drying and then firing in the manner set forth in connection with FIG. 1, completely covers the entire length of the inner and outer surface of the tube and embeds or covers the electrode 211 on both faces of the tube and also embeds that end 214 of the tube which protrudes beyond said electrode.

The outer or silver electrode 216 extends at 216$^a$ over the lower extremity of the ceramic dielectric and covers nearly the entire inner wall and nearly the entire outer wall of the tubular dielectric film 215, both the inner and outer periphery of said silver electrode ending as at 217 at some distance from the extremity 212 of the tube 210. As in the embodiment of FIG. 1, a silver cap 219 engages the extremity 211$^a$ of the inner electrode 211 and extends for a short length as at 219$^a$ along the inner face and as at 219$^b$ along the outer face of the dielectric film, the silver electrode 216 and the silver cap 219 being spaced from each other by a margin 220, both at the inner and outer periphery of the dielectric. Terminal leads 218 and 221 may be applied to the silver electrode and silver cap respectively in the same manner as FIG. 1 or FIG. 1$^a$.

FIG. 4 bears the same relation to the embodiment of FIG. 3 as FIG. 2 does to the embodiment of FIG. 1. Corresponding parts in FIG. 4 have the reference numerals primed of the associated elements of FIG. 3. In this embodiment, a second electrode 231 encompasses the dielectric film 215′ about electrode 211′, both at its inner and outer surfaces. Electrode 231 extends over the extremity at core end 213′ of the dielectric film 215′ and ends at 232 at some distance from the closed end 211$^a$ of electrode 211′. A second dielectric film 233 extending the length of the tube 210′ encompasses the tubular electrode 231, both at its inner and its outer surfaces. Silver terminal 216′ engages electrode 211′ at end 211$^a$ and silver cap 219′ engages electrode 231 at its convex end adjacent end 214′ of the tube 210′. Thus the two capacitor sections, that with dielectric film 215′ and that with dielectric film 233, are connected in parallel.

FIGS. 5 and 6 show an assembly involving a plurality of rod-like units R generally similar to that of FIG. 1, illustratively seven in number, packed in an outer tube 301. The units of FIGS. 5 and 6 are devoid of the terminal leads shown in FIG. 1, but are connected together by solder caps 302 and 303, respectively encompassing the ends of the rods and lodged within the outer tube 301. End seal compound 304 bonds the solder caps of the assembly within the insulating tube 301 and encompasses lead wires 305 and 306 protruding axially outward from the solder caps.

The embodiment of FIGS. 7 and 8 comprises a plurality of nested units of progressively larger diameter, of the general type shown in FIG. 3. These units are shown respectively at T′, T$^2$ and T$^3$. If desired, a rod unit similar to FIG. 1 (not shown) could be placed in the central bore 401 within the innermost tubular capacitor T′. The various tubular capacitors are connected together in parallel in a unit by solder cap connections 402 and 403 at the opposite ends and leads 404 similar to those shown in the embodiment of FIG. 5 place the cartridge fuse shaped capacitor in circuit, with the three capacitor sections T′, T$^2$ and T$^3$ connected in parallel.

Of course the construction of FIGS. 7 and 8 could be embodied in a unit of two sections or of more than the three sections shown.

In the embodiment of FIG. 9, the invention is shown in a plate as distinguished from a rod or tube embodiment. The plate or core 500 is shown rectangular and may be of a thickness as little as .020″. Its length and width would be of magnitude to afford the capacitance desired within available space requirements. The plate is covered by the inner electrode 501, which as in the other embodiments, extends at 502 over one end of the plate and extends lengthwise of both faces of the plate to end at 503 at some distance from the other end 504 of the plate. The ceramic film 505 covers both faces of the plate, coats the electrode and extends substantially the entire length of the plate, desirably terminating at 506 slightly short of the end 502 of electrode 501.

The silver electrode 507 extends over the end 504 of the plate 500 and over the width and length of both faces of the dielectric film 505 and ends as at 508 at some distance from that end of plate 500 that is covered by electrode end 502. The silver cap 509 similar to that of FIG. 1 is plated over the end area 502 of the electrode 501 to extend inward somewhat at 510 along both faces of the dielectric film 505 with a marginal space 511 with respect to the silver electrode 507. Terminal leads (not shown) may be applied in the same manner as in FIG. 1 or 1$^a$.

FIG. 10 shows the plate embodiment of FIG. 9 with two or more of the units in superposed relation and with the silver electrodes 507′ and 507$^2$ soldered together in face to face relation at 512, and the terminal caps 509′ and 509$^2$ similarly soldered together as at 513.

The mode of manufacture of the embodiments of FIGS. 3 to 10 will be apparent from the description of the embodiments of FIGS. 1 and 2.

As many changes could be made in the above capacitor and method, and many apparently widely different embodiments of this invention could be made without departing from the scope of the claims, it is intended that all matter contained in the above description or shown in the accompanying drawings shall be interpreted as illustrative and not in a limiting sense.

Having thus described our invention, what we claim as new and desire to secure by Letters Patent of the United States is:

1. A monolithic ceramic capacitor consisting of a ceramic core having an inner electrode of metal sufficiently refractory to withstand the firing temperature of the ceramic, exposing one end of and substantially completely covering and bonded to substantially the entire remaining surface area including the other end of the core, a ceramic dielectric film substantially covering and directly bonded to substantially the entire outer surface of said inner electrode other than the portion thereof covering said other end of the core and an outer electrode covering said ceramic dielectric film and bonded to substantially the entire area thereof, said capacitor having an insulating coating with terminals accessible therethrough and connected respectively to said inner and outer electrodes, said ceramic and inner electrodes being substantially inert with respect to each other.

2. A monolithic ceramic capacitor substantially as claimed in claim 1 wherein the outer electrode covering said ceramic dielectric film consists of coalesced metal particles bonded to said film.

3. A monolithic ceramic capacitor as claimed in claim 1 wherein the terminal at that end of the film coating beyond the outer electrode comprises a terminal metal cap for the inner electrode.

4. A ceramic capacitor consisting of a ceramic rod, an inner electrode of metal sufficiently refractory to withstand the firing temperature of the ceramic, extending lengthwise of, completely about and over one end of the rod, bonded thereto over substantially the entire surface thereof, other than the opposite end portion of the rod, ceramic film extending substantially the length of said rod, said film coating substantially the length of said inner electrode, leaving exposed the end of the inner electrode adjacent the first named end of said rod, said film being directly bonded to substantially the entire surface of said inner electrode, an outer electrode covering the free end of the rod, extending from said end lengthwise about the film, and terminating at some distance from the first named end of the rod, said capacitor having an insulating coating, said ceramic and inner electrode being substantially inert with respect to each other, and a terminal cap about the end of the film, beyond and spaced from the outer electrode and engaging the end of the inner electrode.

5. The combination recited in claim 4 in which there are interposed between the dielectric film and the outer electrode alternate electrodes and dielectric films, each of the electrodes being shorter than the rod and alternate electrodes extending from opposite ends of the rod, whereby the structure affords a plurality of capacitor sections connected in parallel, each capacitor section having as its dielectric the corresponding dielectric ceramic film.

6. A ceramic capacitor comprising a ceramic plate core, a refractory metal inner electrode coating one end and the two faces of the core, but terminating at some distance from the opposite or free end of the core, a ceramic dielectric film extending the length of the core, and coating the length and width of the inner electrode but leaving exposed the end of the inner electrode adjacent the first named end of said core, said core and dielectric film being of substantially the same ceramic material, and an outer electrode covering the opposite or free end of the core and both faces of the dielectric film and bonded thereto, and terminating at some distance from the electrode coated end of the plate, and a cap structure for terminal connection engaging the inner electrode and extending over part of the length of the dielectric film but spaced from the outer electrode.

7. A ceramic capacitor comprising a plurality of the units recited in claim 6 in superposed position with the respective outer electrodes of the units and the respective cap structures of the units superposed in close juxtaposition with intervening electrical and mechanical bonding connection therebetween.

8. A ceramic capacitor comprising a plurality of rod capacitors of the construction claimed in claim 4, an outer tube encompassing the said capacitors, and conductive caps one within each end of the outer tube, each cap encompassing and engaging all the corresponding ends of the inner tubes for terminal connection of the inner rod capacitors in parallel.

9. The method of preparing a ceramic capacitor which comprises applying to the surface of a core of green ceramic, a suspension of metal over substantially the entire surface of the core other than one end portion thereof, drying the suspension, coating the metal coated core with a slip of ceramic dielectric composition corresponding to that of the core, drying the slip coating, firing the unit to the maturing temperature of the dielectric coating, applying a metal electrode over the common end of the core and slip and over nearly the entire length of the outer surface of the slip, leaving exposed the end portion of the slip at the extremity of the core opposed to that beyond the extremity of the inner electrode, drying and firing the unit, and effecting terminal connections respectively at the extremity of the outer electrode and at the extremity of the inner electrode at opposed ends of the core.

10. The method recited in claim 9 in which the inner electrode is prepared from a suspension of metal from the group consisting of platinum and palladium in a carrier and in which the outer electrode is of metallic silver applied in a suitable vehicle and in which the core and the dielectric film are of the same ceramic composition.

11. The combination recited in claim 10 in which alternate layers of dielectric and electrodes are built upon the core, alternate electrodes being connected to the terminal at one end of the core and the intervening electrodes to the terminal at the other end of the core, the cores and all the dielectric films being fired in one operation.

12. The method of preparing a ceramic capacitor which comprises applying to the surface of a core of green ceramic, resinate of metal selected from the group consisting of platinum and palladium to cover substantially the entire surface of the core other than one end portion thereof, firing the structure to form from the resinate a metal electrode upon the core, coating the metal coated core with a slip of ceramic dielectric of composition corresponding to that of the core, drying the slip coating, firing the unit to the maturing temperature of the core and the dielectric coating, applying a metal electrode over the uncovered end of the core and slip and over nearly the entire length of the outer surface of the slip, leaving exposed the end portion of the slip at that extremity of the core which is covered by the extremity of the inner electrode, drying and firing the unit, and effecting terminal connections to the respective electrodes.

13. In the method of making a capacitor, the provision of a relatively thick base of green titanate ceramic material characterized by high firing temperatures, high shrinkage and high dielectric constant forming a permanent support for the capacitor, said base having rounded vertical edges, applying to the base a coating of metal paint which matures to a metallic coating at the firing temperature of the ceramic, applying over said layer of metal paint a relatively thin layer of unfired slip of the same ceramic as the base, by dipping the base into said slip, said slip being substantially devoid of air, and withdrawing the base, and firing said base with the coatings applied thereto to mature the base, the metal paint coating, and the ceramic slip coating into a unitary ceramic, the matured ceramic slip coating of which is a continuous dielectric, of uniform thickness, the metallic layer of matured metal paint in conjunction with an outer electrode overlying the matured ceramic slip coating providing a capacitor.

14. A capacitor comprising a relatively thick green titanate ceramic base characterized by high firing temperatures, high shrinkage and high dielectric constant, said base having rounded vertical edges, an electrode coating on the base of a metal paint which matures to a metallic coating at the firing temperature of the green ceramic base, a dielectric coating on the metal paint of a slip substantially devoid of air, of the same ceramic as the base and of thickness equal to a small fraction of the thickness of the base and substantially in the range of 1 to 5 mils, the metal paint and the dielectric coating both extending over said rounded, vertical edges, the foregoing being fired into a unitary ceramic, and an outer electrode overlying the dielectric coating and co-operating with the first electrode coating through said dielectric coating.

15. A miniature ceramic capacitor comprising a relatively thick ceramic base having rounded vertical edges, an inner electrode coating of an oxidation resistant non-diffusing metal exposing one end and substantially completely covering the remaining surface of the base including the other end of the base, a dielectric coating of a slip of the same ceramic as the base and substantially free of voids exposing the end of the inner electrode and completely covering the remaining surface of said inner electrode, said dielectric coating being of a thickness equal to a small fraction of the thickness of the base and substantially in the range of 1 to 5 mils thick, the electrode coating and the dielectric coating both extending over said rounded vertical edges, the foregoing being fired into an unitary ceramic and an outer electrode extending to some distance from that end of the dielectric film which is opposed to the exposed end of the base and otherwise substantially completely covering said dielectric coating.

References Cited by the Examiner

UNITED STATES PATENTS

| | | | |
|---|---|---|---|
| 2,253,026 | 8/1941 | Godsey | 317—242 |
| 2,585,752 | 2/1952 | Dorst | 29—25.42 |
| 2,673,972 | 3/1954 | Minnium | 317—242 |
| 2,695,443 | 11/1954 | Wagner | 29—25.42 |
| 2,702,878 | 2/1955 | Heibel | 317—242 |
| 2,728,036 | 12/1955 | Steiner. | |
| 2,759,854 | 8/1956 | Kilby. | |
| 2,769,944 | 11/1956 | Stein et al. | 317—242 |

FOREIGN PATENTS 440,951   1/1936   Great Britain.

LEWIS H. MYERS, *Primary Examiner.*

SAMUEL BERNSTEIN, JOHN F. BURNS, *Examiners.*

E. E. NORRIS, A. C. MARMOR, E. GOLDBERG,
*Assistant Examiners.*